United States Patent
Wohr et al.

[15] 3,702,962
[45] Nov. 14, 1972

[54] AC TO DC RECTIFIER CIRCUIT WITH RAPID TURN-OFF IN CASE OF OVERCURRENT THROUGH THE LOAD CIRCUIT

[72] Inventors: Rolf Wohr, Leonberg; Eckart Gotz, Marbach, both of Germany

[73] Assignee: Robert Bosch GmbH, Gerlingen-Schillerhohe, Germany

[22] Filed: Nov. 9, 1971

[21] Appl. No.: 196,912

[30] Foreign Application Priority Data

Jan. 7, 1971 Germany..........P 21 00 415.9

[52] U.S. Cl...............321/14, 219/69 C, 219/131 WR, 317/33 SC, 321/26
[51] Int. Cl....................................H02m 1/18, H02p
[58] Field of Search..321/14, 26; 219/131 WR, 69 C; 317/33 SC; 328/8

[56] References Cited

UNITED STATES PATENTS

| | | | |
|---|---|---|---|
| 2,158,289 | 5/1939 | Lamm | 321/14 |
| 3,198,989 | 8/1965 | Mahoney | 317/33 SC |
| 3,217,207 | 11/1965 | Webb | 317/33 SC |
| 3,449,654 | 6/1969 | Sheldrake et al. | 321/45 C |

FOREIGN PATENTS OR APPLICATIONS

| | | | |
|---|---|---|---|
| 139,716 | 0/1961 | U.S.S.R. | 321/26 |
| 1,055,855 | 1/1967 | Great Britain | 321/5 |
| 1,373,115 | 8/1964 | France | 321/5 |

Primary Examiner—William H. Beha, Jr.
Attorney—Robert D. Flynn et al.

[57] ABSTRACT

A plurality of main rectifiers are connected to a transformer secondary with one terminal, the other terminal being connected to the load circuit. A sensing circuit is provided to detect over-current conditions. A rapid turn-off circuit is connected to provide reverse current to the rectifier elements, the rapid turn-off circuit being triggered by the sensing circuit and having a series connected control switch, typically a thyristor (SCR), an energy storage device (typically a condenser) and a pair of connections, one of which preferably includes a diode, and connects back to the load terminal of the main rectifier, the other connection, preferably including a smoothing choke, being connected back to the transformer, so that, when the thyristor is triggered, reverse current will be applied to the rectifier and, additionally, the thyristor will be held conductive by current through the transformer and the thyristor connection to the rectifiers.

11 Claims, 1 Drawing Figure

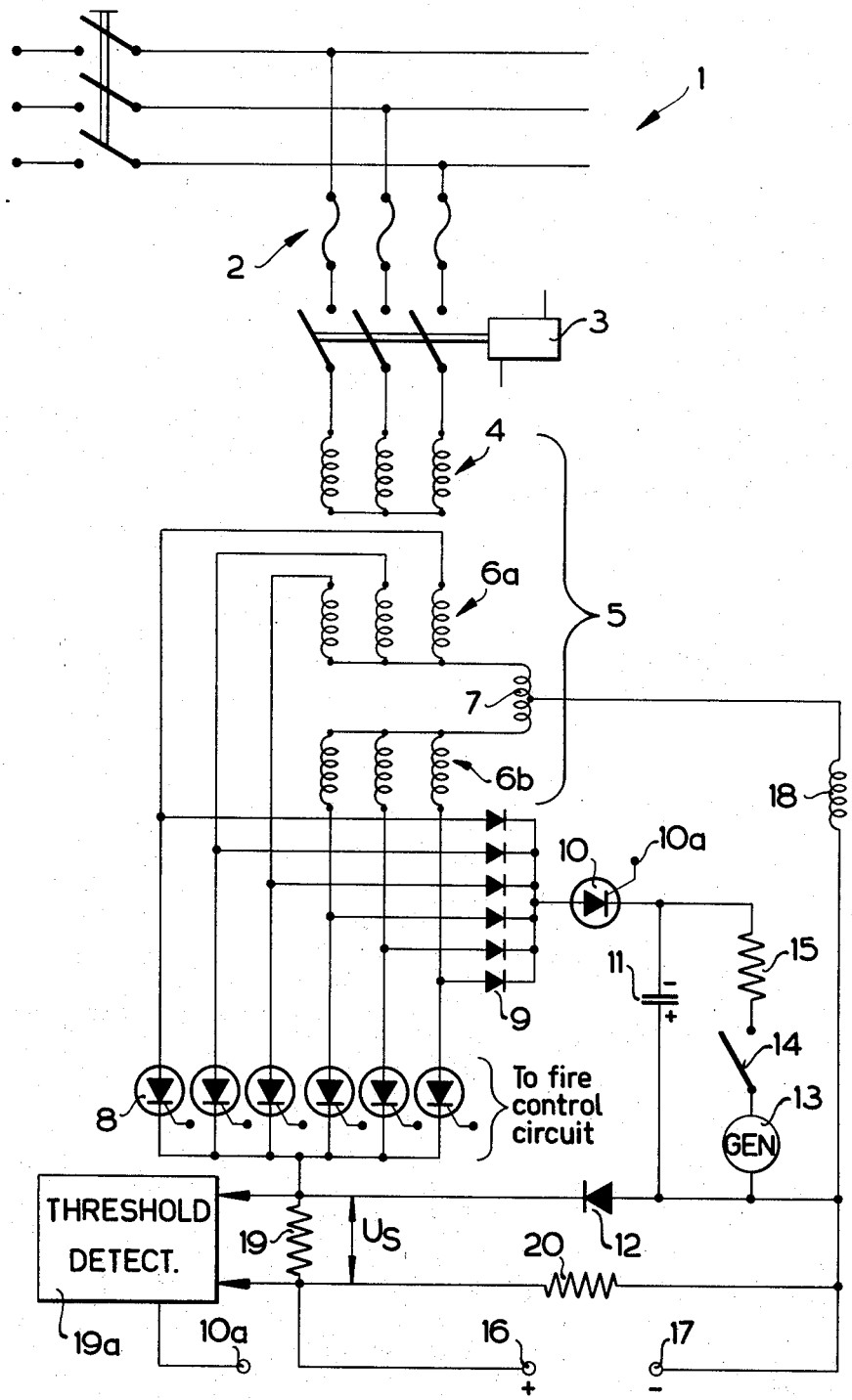

3,702,962

AC TO DC RECTIFIER CIRCUIT WITH RAPID TURN-OFF IN CASE OF OVERCURRENT THROUGH THE LOAD CIRCUIT

The present invention relates to a circuit to obtain direct current from alternating current, and having a group of main rectifier elements connected to the secondary of a transformer.

The circuit of the present invention is particularly useful with rectifier banks, to supply high level direct current output, for use in electroplating, or electrolytic deposition of metal. To obtain effective deposition of metal, it is customary to hold the distance between the work piece to be plated, and the counter electrode, as small as possible. An electrolyte, typically an electrolyte liquid is then supplied under pressure to the space between the electrode and the workpiece. It is sometimes impossible to avoid minor variations in distances between the workpiece and the counter electrode. When this distance drops below a predetermined value, very high currents arise which, in an extreme case involving actual contact between electrode and work piece, may actually cause a short circuit. Changes in distance between counter electrode and work piece may arise, for example, due to shocks or vibrations of the apparatus, variations in pressure on the electrolytic fluid, surface irregularities, or collection of conductive particles on the work piece or the counter electrode. It is therefore important that current supply be interrupted rapidly as soon as an overcurrent condition is detected, in order to prevent damage due to the excessive heating upon excessive localized current or, in an extreme, arcing.

It is an object of the present invention to provide a rectifier arrangement which has a rapid turn-off circuit as part thereof, and which is so designed that the main rectifier elements are disconnected both rapidly and reliably, in order to prevent damage to the work piece, and the counter electrode, when used for electroplating. The circuit of the present invention is, of course, also applicable for other uses.

SUBJECT MATTER OF THE PRESENT INVENTION

Briefly, the basic circuit of a transformer feeding a bank of rectifiers has a rapid turn-off circuit connected thereto, which includes a switching element, typically a thyristor (for example an SCR) which has a series connected condenser, the condenser being charged to a voltage which is high with respect to the load voltage, for example by an auxiliary source. The condenser is then connected to a pair of connections, one leading to the terminal of the main rectifier elements connected to the load, and the other leading back to the transformer. An overcurrent sensing circuit is provided, which fires the thyristor when an overcurrent condition is detected, permitting the charged energy storage condenser to discharge and provide counter current flow to the main rectifier element, thus reliably and rapidly interrupting current therethrough. The thyristor is maintained in conductive condition by current through the second branch to the transformer, which preferably includes a smoothing choke, and to hold the circuit turned off. The circuit is simple, reliable, and requires few parts in addition to the normal rectifier circuit, while providing effective protection.

The invention will be described by way of example with reference to the accompanying drawings, wherein the single FIGURE is a schematic circuit diagram of a rectifier circuit with the protective circuit to rapidly turn off the main rectifier bank.

A three-phase supply network 1 is connected over fuses 2, a main switch 3, to the primary 4 of a transformer 5. The transformer has split secondary windings 6a, 6b, which are interconnected by a drainage coil 7. Each of the secondary windings 6 is connected to the anode of a main rectifying thyristor 8, the cathodes of which are connected together. The gates of the thyristors 8 are connected to a fire control circuit to phase the firing of the thyristors as desired. Such fire control circuits are well known and need not be described. The cathodes of the thyristors are interconnected and are connected to the positive output 16 to which the load circuit is to be connected. The negative terminal 17 for the load circuit is connected over a smoothing choke 18 to the drainage coil 7.

The rapid turn-off protective circuit includes a group of diodes 9, one each connected to the secondary 6a, 6b of the transformer and having their cathodes interconnected, to form together an OR-gate. The common junction point of diodes 9 is connected to the anode of a thyristor 10, the cathode of which is connected in series to a storage condenser 11. The other terminal of storage condenser 11 is connected to a junction and branches, on the one side, to the anode of a diode 12, the cathode of which is connected to the common connection of the thyristors 8. The other side of the junction is connected back to the transformer, for example by being connected to the smoothing choke 18. A charging circuit for condenser 11 is connected in parallel thereto and includes a source of direct current potential 13, a limiting resistor 15 and a switch 14. The direct current generator 13, when switch 14 is closed, charges the storage condenser 11 to a voltage which is high with respect to the voltage across terminal 16, 17 at the load side. A small resistance 19, forming a measuring resistance is connected in series between the common connection of the thyristors 8 and the load terminal 16. A voltage $U_S$ will be developed across resistance 19 which is sensed in a threshold detector 19a, connected thereacross, and providing an output pulse when the voltage drop $U_S$ across resistance 19 exceeds a predetermined value, indicative of excessive load current. A base, or drain resistance 20 is connected across the load terminal 16, 17. The output of the threshold detector is connected to the gate 10a of the thyristor 10.

Operation: Upon energization of the transformer 5, voltages are induced in the secondary winding 6a, 6b. The alternating current voltage is rectified, and the current is controlled by the six thyristors 8, energized and phase-controlled by a fire control circuit. Voltage $U_S$ drops across the sensing resistance 19, corresponding to the current flowing through the load between terminal 16, 17. When this current exceeds a certain predetermined value, threshold detector 19a responds and applies a pulse to the gate circuit 10a of the thyristor 10. As soon as thyristor 10 becomes conductive, the condenser 11 discharges through the condenser. Initially, current will flow over diode 12 and in reverse over the then conductive thyristor 8, one of the diodes 9, and back to the thyristor 10. The thyristor 8 will be effectively extinguished. A portion of the discharge current from condenser 11 will flow over the second branch of the series circuit, that is, over smoothing choke 18 and into drainage coil 7 of transformer 5, and back to the secondary winding 6a, 6b respectively, and returning over diode 9 to thyristor 10. This discharge of condenser 11 will continue even after the current through diode 12 stops, due to the blocking of thyristor 8, the cathode potential of the thyristors 8 being held positive with respect to their anode potential longer than the conductive period normal for the specific thyristor. This reliably interrupts conduction of the thysistor and causes its rapid extinction.

The circuit will revert to conduction only after a short time delay, during which the switch 14 must be closed, to charge condenser 11 to its full voltage.

The circuit of the present invention is simple and inexpensive, and reliably and rapidly turns off the specific thyristor which is conductive at any one instance, as soon as current through the load circuit exceeds a predetermined value, for example, as soon as the current between a work piece and the counter electrode in an electrolytic plating bath increases beyond a safe value.

The transformer preferably has a drainage coil 7, but this is not a requirement. Other transformers, and other rectifier circuits may be used, such as bridge connections, delta connections, star connections, or double star connections, as known in the art.

The OR gate formed by the diodes 9 connected to the thyristor 10 may be replaced by a group of thyristors 10, each having their gates connected to the terminal 10a of the threshold detector, thus decreasing the total number of components, at the cost, however, of increasing the number of the thyristors. The diode 12 is not strictly necessary, if the commutation current for the thyristors is permitted to flow over the load resistance, the branch then arising at the junction between choke 18 and terminal 17, 16 of the load. The thyristor switches off even more rapidly under such conditions, since the diode element, required to switch from blocked to conductive state, is not used.

Various changes and modifications may be made within the inventive concept.

I claim:

1. AC to DC rectifier circuit with rapid turn off to prevent damage in case of excessive current through a load circuit, having
    a transformer (5) adapted for connection to a source of AC;
    a plurality of main rectifier elements (8) connected to the secondary (6a, 6b) of the transformer and adapted to be successively conductive and connected to the load circuit;
    means (19, 19a) sensing overcurrent condition in the load circuit and providing a control output indicative of such overcurrent condition;
    and a rapid turn-off circuit for the rectifiers comprising
    a series circuit including a controlled switching element (10) having a control input (10a) connected and responsive to the control output of the sensing means, the controlled switching element being connected to be normally non-conductive;
    an energy storage device (11) having one terminal connected to the other terminal of the switching element;
    and a pair of connections (12, 18) from the other terminal of the storage device and forming a pair of other terminals of the series circuit, one terminal of the series circuit being connected to the transformer-rectifier element connections and the second other terminal being connected to the transformer so that, when the overcurrent condition is sensed, the switching element will be rendered conductive and the energy storage device will deliver its stored energy and supply reverse current over said one terminal in counterflow against the normal current flow direction of the rectifier elements to rapidly switch off the rectifier elements and thus remove power from the load circuit, and current from the other terminal will maintain current through the controlled switching element even after turn off of the previously conductive rectifier.

2. Circuit according to claim 1, wherein the transformer is a drainage coil transformer, and the second other terminal is connected to the drainage coil.

3. Circuit according to claim 1, wherein the one connection includes a diode (12).

4. Circuit according to claim 1, wherein the other connection includes a smoothing choke (18).

5. Circuit according to claim 1, wherein one terminal of the series connection is interconnected to one terminal, each, of the main rectifier elements.

6. Circuit according to claim 1, including an auxiliary energy source (13) and a switch (14) selectively interconnecting the auxiliary energy source with the energy storage device to charge the energy storage device.

7. Circuit according to claim 1, wherein the main rectifier elements are thyristors (8) having one terminal, each, connected to the transformer;
    a group of diodes (9) having terminals of like polarity connected thereto and the other terminals interconnected and forming an OR-gate, connected to said one terminal of the series circuit;
    the controlled switching element comprises a thyristor (10) having its main current path in normal current flow direction connected to the diode (9) and the energy storage device (11).
    and the second other terminal of the series circuit is connected to the transformer, and hence to the one terminal of the main rectifier elements.

8. Circuit according to claim 7, wherein one connection forming the one other terminal of the series circuit comprises a diode (12) connected in current flow direction to the energy storage device.

9. Circuit according to claim 7, wherein the other connection forming another terminal comprises a smoothing choke interconnecting the energy storage device and the thyristor to the transformer.

10. Circuit according to claim 8, wherein the transformer comprises an auxiliary tapped drainage coil winding and wherein the other connection forming the other terminal of the series circuit comprises a smoothing choke (18) interconnecting the energy storage device device (11) and the thyristor with the smoothing choke.

11. Circuit according to claim 1, including means charging the energy storage device to a voltage level which is high with respect to the voltage across the load circuit.

* * * * *